(12) United States Patent
Rofougaran

(10) Patent No.: US 8,064,949 B2
(45) Date of Patent: Nov. 22, 2011

(54) METHOD AND SYSTEM FOR BLUETOOTH AND FM RADIO COMMUNICATION

(75) Inventor: Ahmadreza Rofougaran, Newport Coast, CA (US)

(73) Assignee: Broadcom Corporation

( * ) Notice: Subject to any disclaimer, the term of this patent is extended or adjusted under 35 U.S.C. 154(b) by 878 days.

(21) Appl. No.: 11/425,558

(22) Filed: Jun. 21, 2006

(65) Prior Publication Data

US 2011/0223967 A9    Sep. 15, 2011

Related U.S. Application Data

(63) Continuation-in-part of application No. 11/286,555, filed on Nov. 22, 2005.

(60) Provisional application No. 60/685,239, filed on May 26, 2005.

(51) Int. Cl.
*H04M 1/00* (2006.01)

(52) U.S. Cl. ........ 455/552.1; 455/41.2; 455/84; 455/86; 455/87; 455/553.1; 455/164.1; 455/164.2; 455/165.1; 455/183.1; 455/183.2; 455/186.1

(58) Field of Classification Search ................. 455/41.2, 455/78–87, 552.1, 553.1, 164.1–164.2, 165.1, 455/183.1–183.2, 186.1
See application file for complete search history.

(56) References Cited

U.S. PATENT DOCUMENTS

| 5,519,887 A | * | 5/1996 | Lieu ............................. 455/266 |
| 6,609,010 B1 | * | 8/2003 | Dolle et al. ................ 455/552.1 |
| 6,904,266 B1 | * | 6/2005 | Jin et al. ......................... 455/20 |
| 2002/0137460 A1 | * | 9/2002 | Sun et al. ........................ 455/41 |
| 2003/0194972 A1 | * | 10/2003 | Harada et al. ................... 455/69 |

* cited by examiner

*Primary Examiner* — Tuan A Tran
(74) *Attorney, Agent, or Firm* — McAndrews, Held & Malloy, Ltd.

(57) ABSTRACT

Frequency conversion methods and systems for Bluetooth and FM radio communication are provided. FM data may be received and/or transmitted via the FM radio and Bluetooth data may be received and/or transmitted via the Bluetooth radio. With an integration of frequency conversion for Bluetooth and FM, both systems can operate from a single frequency source, thereby reducing part count and power consumption. Communication between Bluetooth and FM channels may be enabled via a single chip.

17 Claims, 7 Drawing Sheets

METHOD AND SYSTEM FOR BLUETOOTH AND FM RADIO COMMUNICATION

CROSS-REFERENCE TO RELATED APPLICATIONS/INCORPORATION BY REFERENCE

The application is a continuation-in-part of application Ser. No. 11/286,555, filed on Nov. 22, 2005, which claims priority to, and claims the benefit of U.S. Provisional Application Ser. No. 60/685,239 filed on May 26, 2005.

This application also makes reference to:
U.S. application Ser. No. 11/287,120 filed on Nov. 22, 2005;
U.S. application Ser. No. 11/286,950 filed on Nov. 22, 2005;
U.S. application Ser. No. 11/287,075 filed on Nov. 22, 2005;
U.S. application Ser. No. 11/287,181 filed on Nov. 22, 2005;
U.S. application Ser. No. 11/286,947 filed on Nov. 22, 2005;
U.S. application Ser. No. 11/287,034 filed on Nov. 22, 2005;
U.S. application Ser. No. 11/287,044 filed on Nov. 22, 2005;
U.S. application Ser. No. 11/286,844 filed on Nov. 22, 2005;
U.S. application Ser. No. 11/425,551 filed on Jun. 21, 2006;
U.S. application Ser. No. 11/425,571 filed on Jun. 21, 2006; and
U.S. Utility application Ser. No. 11/176,417 filed on Jul. 7, 2005.

Each of the above stated applications is hereby incorporated herein by reference in its entirety.

FIELD OF THE INVENTION

Certain embodiments of the invention relate to Bluetooth and FM communication technologies. More specifically, certain embodiments of the invention relate to a method and system for Bluetooth and FM radio communication.

BACKGROUND OF THE INVENTION

With the popularity of portable electronic devices and wireless devices that support audio applications, there is a growing need to provide a simple and complete solution for audio communications applications. For example, some users may utilize Bluetooth-enabled devices, such as headphones and/or speakers, to allow them to communicate audio data with their wireless handset while being free to perform other activities. Other users may have portable electronic devices that may enable them to play stored audio content and/or receive audio content via broadcast communication, for example.

However, integrating multiple audio communication technologies into a single device may be costly. Combining a plurality of different communication services into a portable electronic device or a wireless device may require separate processing hardware and/or separate processing software. Moreover, coordinating the reception and/or transmission of data to and/or from the portable electronic device or a wireless device may require significant processing overhead that may impose certain operation restrictions and/or design challenges. For example, a handheld device such as a cellphone that incorporates Bluetooth and Wireless LAN may pose certain coexistence problems caused by the close proximity of the Bluetooth and WLAN frequency converters.

Furthermore, simultaneous use of a plurality of radios in a handheld may result in significant increases in power consumption. Power being a precious commodity in most wireless mobile devices, combining devices such as a cellular radio, a Bluetooth radio and a WLAN radio requires careful design and implementation in order to minimize battery usage. Additional overhead such as sophisticated power monitoring and power management techniques are required in order to maximize battery life. Moreover, the use of linear transmit-antennas for Bluetooth and FM radio is expensive in terms of power consumption.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for Bluetooth and FM radio communication, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a frequency conversion method and system for Bluetooth and FM radio communication. Certain embodiments of the invention may incorporate a single chip with Bluetooth and FM radio. The single chip Bluetooth and FM radio may provide a versatile platform that supports both Bluetooth and FM audio capabilities. For example, a user may have the capability to select from multiple audio-based services without the need to purchase and travel with a plurality of different devices. In one embodiment of the invention, Bluetooth data may be transmitted via a first RF signal that is modulated by a programmable synthesizer. Bluetooth data may be received by down-converting a second RF signal with a carrier frequency that is generated by the programmable synthesizer. The programmable synthesizer may be controlled so that switching occurs between generation of the first RF signal and the second RF signal during time multiplexing between transmission and reception.

Figure 1A:
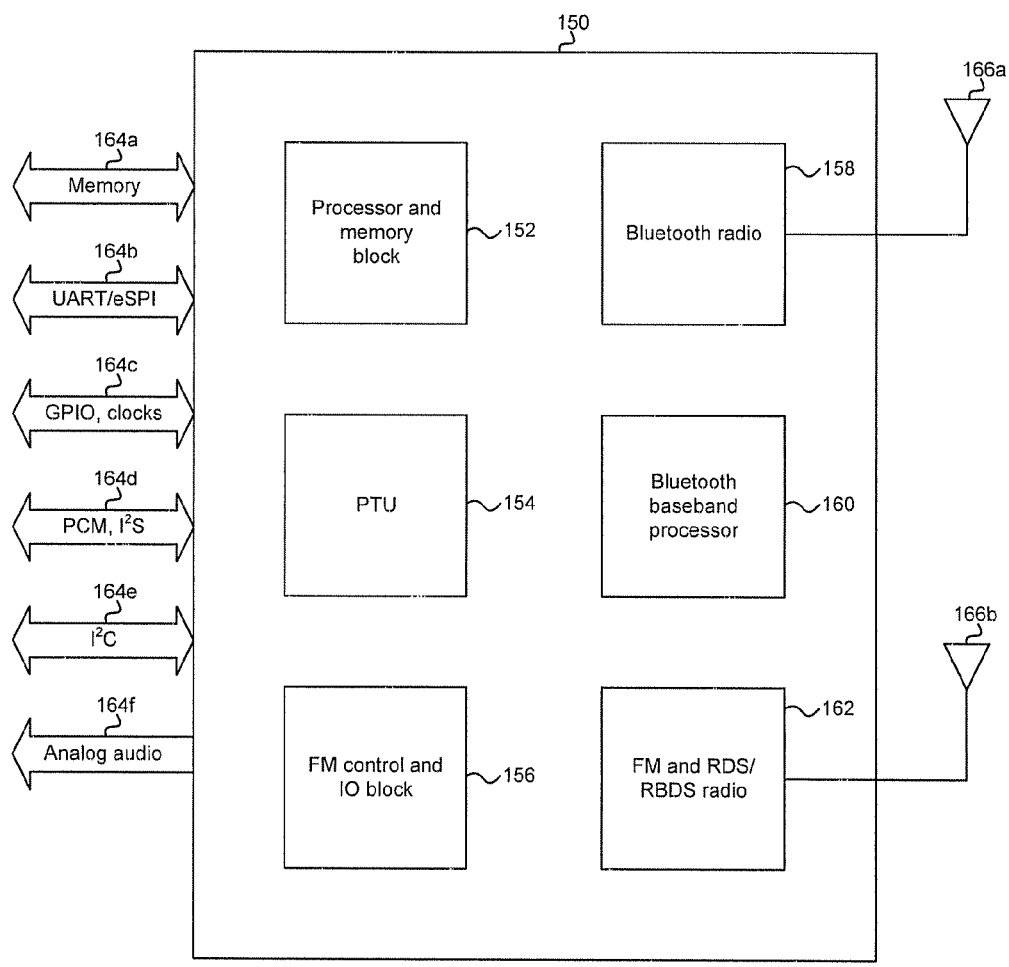
FIG. 1A is a block diagram of an exemplary single chip with integrated Bluetooth and FM radios that supports multiple interfaces, in accordance with an embodiment of the invention.

FIG. 1A is a block diagram of an exemplary single chip with integrated Bluetooth and FM radios that supports multiple interfaces, in accordance with an embodiment of the invention. Referring to FIG. 1A, there is shown a single chip 150 that supports Bluetooth and FM radio communications. The single chip 150 may comprise a processor and memory block 152, a PTU 154, an FM control and input-output (IO) block 156, a Bluetooth radio 158, a Bluetooth baseband processor 160, and an FM and radio data system (RDS) and radio broadcast data system (RBDS) radio 162. A first antenna or antenna system 166a may be communicatively coupled to the Bluetooth radio 158. A second antenna or antenna system 166b may be communicatively coupled to the FM and RDS/RBDS radio 162.

The processor and memory block 152 may comprise suitable logic, circuitry, and/or code that may enable control, management, data processing operations, and/or data storage operations, for example. The PTU 154 may comprise suitable logic, circuitry, and/or code that may enable interfacing the single chip 150 with external devices. The FM control and IO block 156 may comprise suitable logic, circuitry, and/or code that may enable control of at least a portion of the FM and RDS/RBDS radio 162. The Bluetooth radio 158 may comprise suitable logic, circuitry, and/or code that may enable Bluetooth communications via the first antenna 166a. The FM and RDS/RBDS radio 162 may comprise suitable logic, circuitry, and/or code that may enable FM, RDS, and/or RBDS data communication via the second antenna 166b. The Bluetooth baseband processor 160 may comprise suitable logic, circuitry, and/or code that may enable processing of baseband data received from the Bluetooth radio 158 or baseband data to be transmitted by the Bluetooth radio 158.

The PTU 154 may support a plurality of interfaces. For example, the PTU 154 may support an external memory interface 164a, a universal asynchronous receiver transmitter (UART) and/or enhanced serial peripheral interface (eSPI) interface 164b, a general purpose input/output (GPIO) and/or clock interface 164c, a pulse-code modulation (PCM) and/or an inter-IC sound (I²S) interface 164d, an inter-integrated circuit (I²C) bus interface 164e, and/or an audio interface 164f.

Aspects of the method and system may comprise a single chip that comprises a Bluetooth radio, an FM radio, a processor system, and a peripheral transfer unit (PTU). FM data may be received and/or transmitted via the FM radio and Bluetooth data may be received and/or transmitted via the Bluetooth radio. The FM radio may receive radio data system (RDS) data. The PTU may support a plurality of digital and analog interfaces that provides flexibility with the handling of data. A processor in the processor system may enable time-multiplexed processing of FM data and processing of Bluetooth data. The single chip may operate in an FM-only, a Bluetooth-only, and an FM-Bluetooth mode. The single chip may reduce power consumption by disabling portions of the Bluetooth radio during FM-only mode and/or disabling analog circuitry when performing digital processing. Communication between Bluetooth and FM channels may be enabled via the single chip.

Figure 1B:
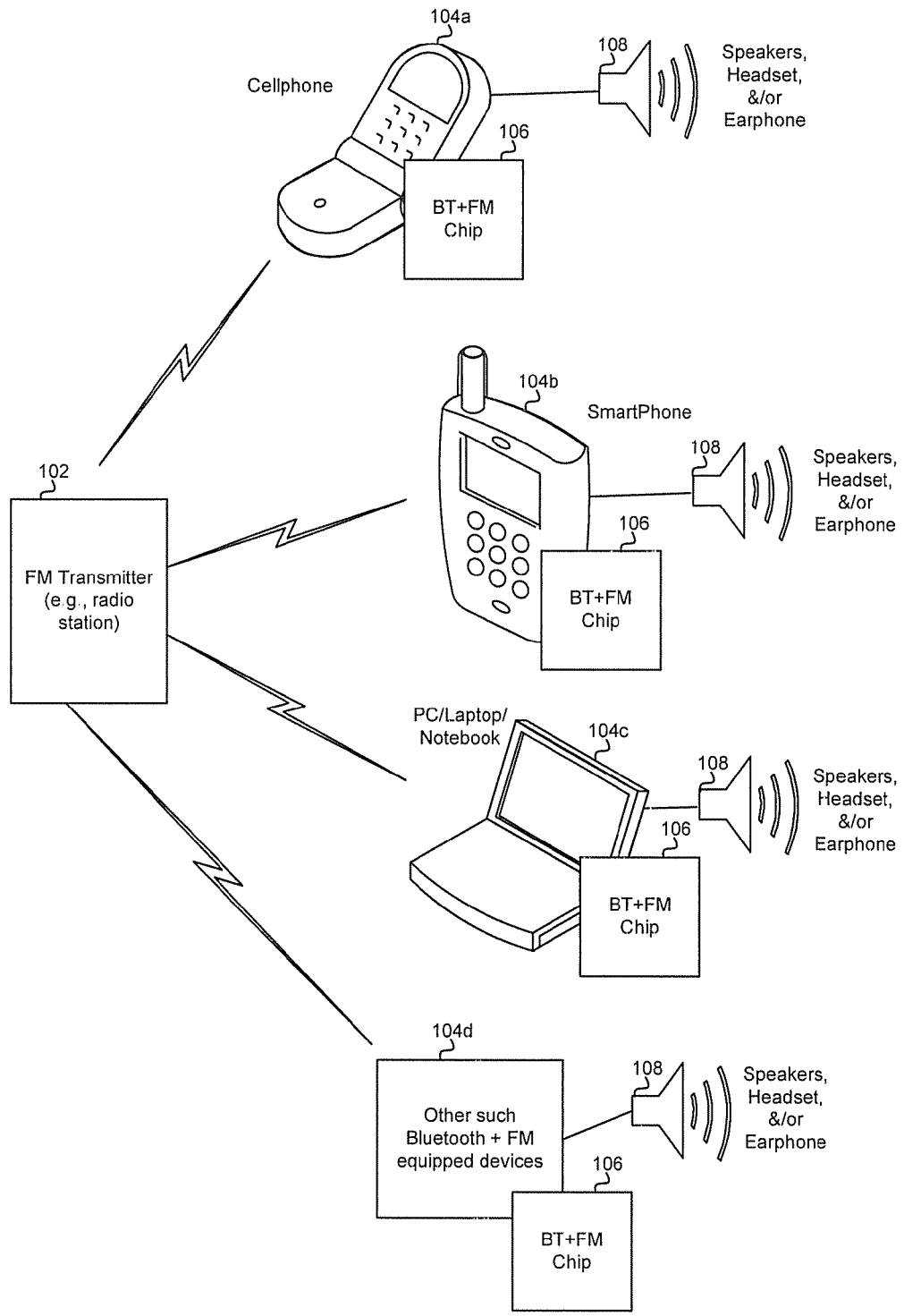
FIG. 1B is a block diagram of an exemplary FM transmitter that communicates with handheld devices that utilize a single chip with integrated Bluetooth and FM radios, in accordance with an embodiment of the invention.

FIG. 1B is a block diagram of an exemplary FM transmitter that communicates with handheld devices that utilize a single chip with integrated Bluetooth and FM radios, in accordance with an embodiment of the invention. Referring to FIG. 1B, there is shown an FM transmitter 102, a cellular phone 104a, a smart phone 104b, a computer 104c, and an exemplary FM and Bluetooth-equipped device 104d. The FM transmitter 102 may be implemented as part of a radio station or other broadcasting device, for example. Each of the cellular phone 104a, the smart phone 104b, the computer 104c, and the exemplary FM and Bluetooth-equipped device 104d may comprise a single chip 150 with integrated Bluetooth and FM radios for supporting FM and Bluetooth data communications. The FM transmitter 102 may enable communication of FM audio data to the devices shown in FIG. 1B by utilizing the single chip 150. Each of the devices in FIG. 1B may comprise and/or may be communicatively coupled to a listening device 108 such as a speaker, a headset, or an earphone, for example.

The cellular phone 104a may be enabled to receive an FM transmission signal from the FM transmitter 102. The user of the cellular phone 104a may then listen to the transmission via the listening device 108. The cellular phone 104a may comprise a "one-touch" programming feature that enables pulling up specifically desired broadcasts, like weather, sports, stock quotes, or news, for example. The smart phone 104b may be enabled to receive an FM transmission signal from the FM transmitter 102. The user of the smart phone 104b may then listen to the transmission via the listening device 108.

The computer 104c may be a desktop, laptop, notebook, tablet, and/or a PDA, for example. The computer 104c may be enabled to receive an FM transmission signal from the FM transmitter 102. The user of the computer 104c may then listen to the transmission via the listening device 108. The computer 104c may comprise software menus that configure listening options and enable quick access to favorite options, for example. In one embodiment of the invention, the computer 104c may utilize an atomic clock FM signal for precise timing applications, such as scientific applications, for example. While a cellular phone, a smart phone, computing devices, and other devices have been shown in FIG. 1B, the single chip 150 may be utilized in a plurality of other devices and/or systems that receive and use Bluetooth and/or FM signals. In one embodiment of the invention, the single chip Bluetooth and FM radio may be utilized in a system comprising a WLAN radio.

Figure 1C:
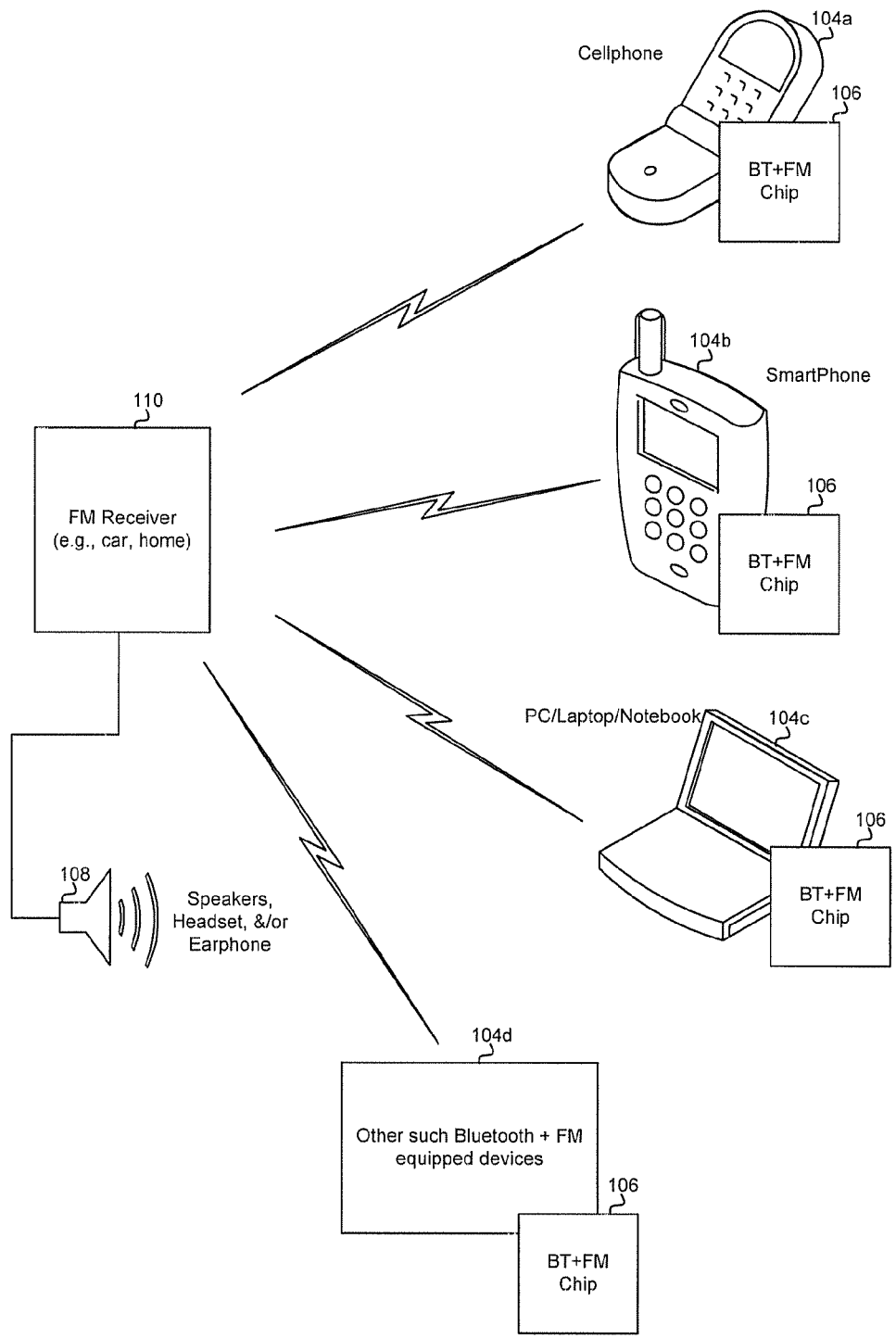
FIG. 1C is a block diagram of an exemplary FM receiver that communicates with handheld devices that utilize a single chip with integrated Bluetooth and FM radios, in accordance with an embodiment of the invention.

FIG. 1C is a block diagram of an exemplary FM receiver that communicates with handheld devices that utilize a single chip with integrated Bluetooth and FM radios, in accordance with an embodiment of the invention. Referring to FIG. 1C, there is shown an FM receiver 110, the cellular phone 104a, the smart phone 104b, the computer 104c, and the exemplary FM and Bluetooth-equipped device 104d. In this regard, the FM receiver 110 may comprise and/or may be communicatively coupled to a listening device 108. A device equipped with the Bluetooth and FM frequency converters, such as the single chip 150, may be able to broadcast its respective signal to a "deadband" of an FM receiver for use by the associated audio system. For example, a cellphone or a smart phone, such as the cellular phone 104a and the smart phone 104b, may transmit a telephone call for listening over the audio system of an automobile, via usage of a deadband area of the car's FM stereo system. One advantage may be the universal ability to use this feature with all automobiles equipped simply with an FM radio with few, if any, other external FM transmission devices or connections being required.

In another example, a computer, such as the computer 104c, may comprise an MP3 player or another digital music format player and may broadcast a signal to the deadband of an FM receiver in a home stereo system. The music on the computer may then be listened to on a standard FM receiver with few, if any, other external FM transmission devices or connections. While a cellular phone, a smart phone, and computing devices have been shown, a single chip that combines a Bluetooth and FM frequency converter and/or receiver may be utilized in a plurality of other devices and/or systems that receive and use an FM signal.

Figure 2:
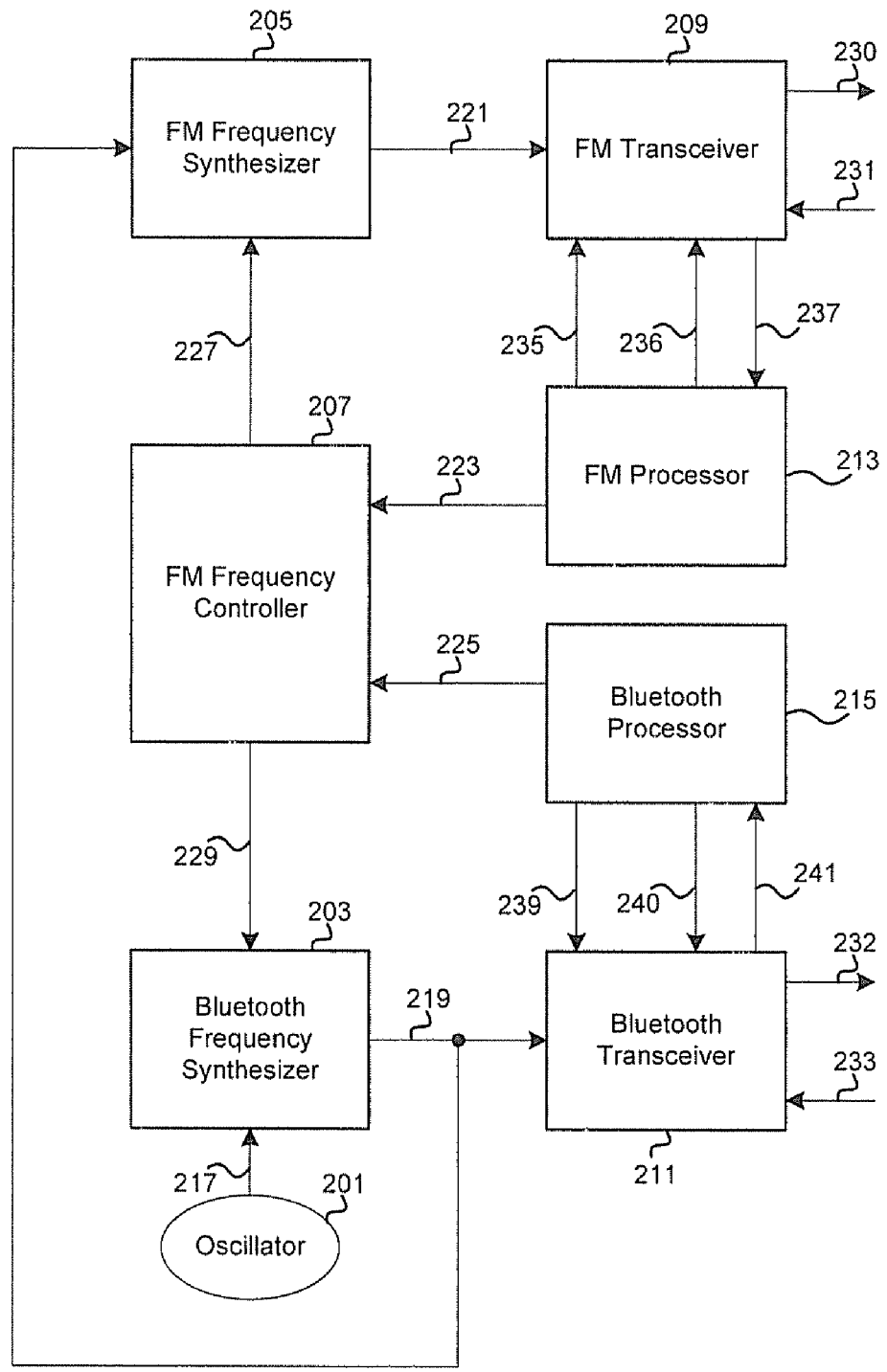
FIG. 2 is a block diagram of an exemplary system that supports Bluetooth and FM radio communication in accordance with an embodiment of the invention.

FIG. 2 is a block diagram of an exemplary system that supports Bluetooth and FM radio communication in accordance with an embodiment of the invention. The system comprises an oscillator 201, a Bluetooth frequency synthesizer 203, an FM frequency synthesizer 205, a frequency controller 207, an FM transceiver 209, Bluetooth transceiver 211, an FM processor 213, and a Bluetooth processor 215.

The oscillator 201 may be a temperature controlled crystal oscillator. The oscillator 201 may enable generation of a clock frequency 217 (e.g. 13 MHz, 26 MHz, 24.3 MHz) that may be utilized to drive the Bluetooth frequency synthesizer 203. The Bluetooth frequency synthesizer 203 may be a radio frequency generator that enables generation of a Bluetooth carrier frequency 219. In an exemplary embodiment of the invention, the Bluetooth carrier frequency 219 may be represented by the following relationship:

$$2.4 \text{ GHz} + BT_{chan\_num} \times 1 \text{ MHz},$$

where $BT_{chan\_num}$ is the channel number for the Bluetooth communication. It should be noted that the IF may not be fixed or a direct conversion but it can be any frequency.

The Bluetooth transceiver 211 may utilize the Bluetooth carrier frequency 219 to up-convert a baseband Bluetooth transmit signal 240, thereby generating an output RF Bluetooth transmit signal 232. The Bluetooth transceiver 211 may utilize the Bluetooth carrier frequency 219 to down-convert an RF Bluetooth receive signal 233, thereby generating a baseband Bluetooth receive signal 241. The Bluetooth processor 215 may generate control signal 239 that may enable time division multiplexing of transmission and reception by the Bluetooth transceiver 221. The Bluetooth processor 215 may also enable sending of a $BT_{chan\_num}$ via signal 225 to the frequency controller 206, which may be utilized to control operation of the Bluetooth frequency synthesizer 203. The frequency controller 207 may utilize the $BT_{chan\_num}$ from signal 225 to control the Bluetooth frequency synthesizer 203 during adaptive frequency hopping (AFH).

In another embodiment of the invention, the RF Bluetooth transmit signal 232 may be generated directly by modulating the Bluetooth carrier frequency 219 as $2.4 \text{ GHz} + BT_{chan\_num} \times 1 \text{ MHz} + \Delta f_{BT\_data}$, where $\Delta f_{BT\_data}$ is the frequency deviation that corresponds to the data in the transmitted Bluetooth signal. When the RF Bluetooth transmit signal 232 is generated in the Bluetooth frequency synthesizer 203, the Bluetooth processor 215 may communicate the $BT_{chan\_num}$ and $\Delta f_{BT\_data}$ via signal 225 to the frequency controller 207.

The FM frequency synthesizer 205 may enable generation of a FM carrier frequency 221 based on the Bluetooth carrier frequency 219 generated by the Bluetooth synthesizer 203. The FM carrier frequency 221 may be represented by the following relationship:

$$47.9 + FM_{chan\_num} \times 0.2 \text{ MHz},$$

where $FM_{chan\_num}$ is an integer channel designation from 201 to 300.

The FM transceiver 209 may utilize the generated FM carrier frequency 221 to up-convert a baseband FM transmit signal 236, thereby generating an RF FM transmit signal 230. The FM transceiver 209 may use the generated FM carrier frequency 221 to down-convert a received RF FM signal 231, thereby generating a baseband FM receive signal 237. The FM processor 213 may generate a control signal 235 that may control time division multiplexing during transmission and reception by the FM transceiver 209.

In an another embodiment of the invention, the RF FM transmit signal 230 may be generated directly by modulating the FM carrier frequency 221 as $47.9 + FM_{chan\_num} \times 0.2 \text{ MHz} + \Delta f_{FM\_data}$, where $\Delta f_{FM\_data}$ is the frequency deviation that corresponds to the data in the transmitted FM signal. When the RF FM transmit signal 230 is generated in the FM frequency synthesizer 205, the FM processor 213 may communicate the $FM_{chan\_num}$ 223 and $\Delta f_{FM\_data}$ to the frequency controller 207.

The FM frequency synthesizer 205 may enable generation of the FM carrier frequency 221 by dividing the Bluetooth carrier frequency 219 by a divisor 227 that is supplied by the frequency controller 207. The frequency controller 207 may enable generation of the divisor 227 as the ratio of the Bluetooth carrier frequency 219 ($2.4 \text{ GHz} + BT_{chan\_num} \times 1 \text{ MHz} + \Delta f_{BT\_data}$) to the FM carrier frequency 221 ($47.9 + FM_{Rx\_chan} \times 0.2 \text{ MHz} + \Delta f_{FM\_data}$).

Figure 3:
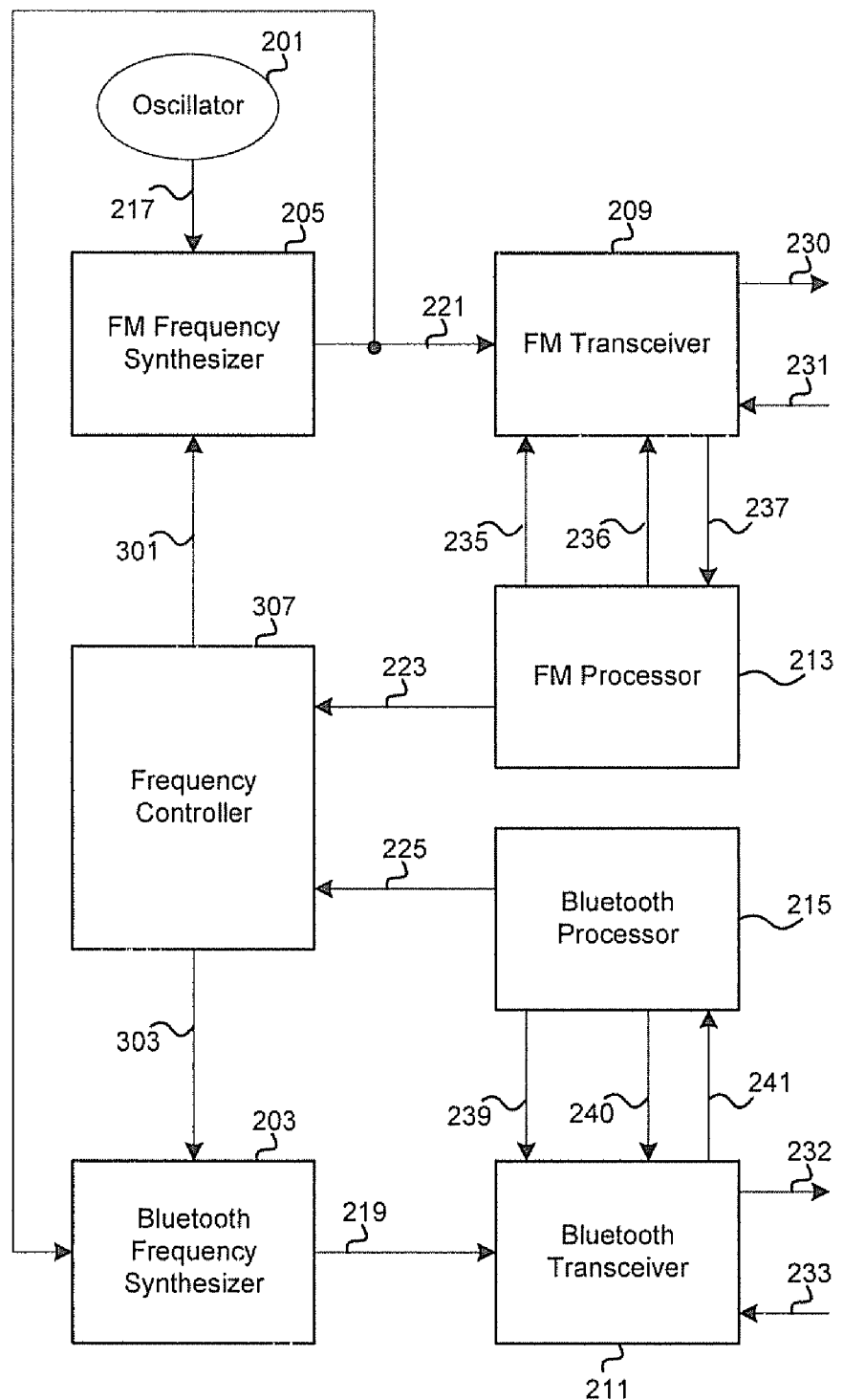
FIG. 3 is a block diagram of another exemplary system that supports Bluetooth and FM radio communication in accordance with an embodiment of the invention.

FIG. 3 is a block diagram of another exemplary system that supports Bluetooth and FM radio communication in accordance with an embodiment of the invention. The system comprises an oscillator 201, a Bluetooth frequency synthesizer 203, an FM frequency synthesizer 205, a frequency controller 207, an FM transceiver 209, a Bluetooth transceiver 211, an FM processor 213, and a Bluetooth processor 215.

The oscillator 201 may be a temperature controlled crystal oscillator. The oscillator 201 may enable generation of a clock frequency 217 (e.g. 13 MHz, 26 MHz, 24.3 MHz etc) that may be utilized to drive the FM frequency synthesizer 205. The FM carrier frequency 221 may be represented by the following expression:

$$47.9 + FM_{chan\_num} \times 0.2 \text{ MHz},$$

where $FM_{chan\_num}$ is an integer channel designation from 201 to 300.

The FM transceiver 209 may utilize the FM carrier frequency 221 to up-convert a baseband FM transmit signal 236, thereby generating an RF FM transmit signal 230. The FM transceiver 209 may utilize the FM carrier frequency 221 to down-convert a received RF FM signal 231, thereby generating an output baseband FM signal 237. The output baseband FM signal 237 may be communicated to the FM processor 213. The FM processor 213 may generate a control signal 235, which may enable time division multiplexing of transmission and reception by the FM transceiver 209.

In another embodiment of the invention, the RF FM transmit signal 230 may be generated directly by modulating the FM carrier frequency 221, which may be represented as:

$$47.9 + FM_{chan\_num} \times 0.2 \text{ MHz} + \Delta f_{FM\_data},$$

where $\Delta f_{FM\_data}$ is the frequency deviation that corresponds to the data in the transmitted FM signal. When the RF FM transmit signal 231 is generated in the FM frequency synthesizer 205, the FM processor 213 may send $FM_{chan\_num}$ and $\Delta f_{FM\_data}$ 223 to the frequency controller 207.

The Bluetooth frequency synthesizer 203 may be a radio frequency generator that enables generation of a Bluetooth carrier frequency 219 based on the FM carrier frequency 221. In an exemplary embodiment of the invention, the Bluetooth carrier frequency 219 may be represented by the following expression:

$$2.4 \text{ GHz} + BT_{chan\_num} \times 1 \text{ MHz},$$

where $BT_{chan\_num}$ is the channel number for the Bluetooth communication. It should noted that the IF may not be fixed or a direct conversion but it can be any frequency.

The Bluetooth transceiver 211 may utilize the Bluetooth carrier frequency 219 to up-convert a baseband Bluetooth transmit signal 240, thereby generating an RF Bluetooth transmit signal 232. The Bluetooth transceiver 211 may utilize the Bluetooth carrier frequency 219 to down-convert an RF Bluetooth receive signal 233, thereby generating a baseband Bluetooth receive signal 241. The Bluetooth processor 215 may generate a control signal 239, which may enable time division multiplexing of transmission and reception in the Bluetooth transceiver 211. The Bluetooth processor 215 may also generate a $BT_{chan\_num}$, which may be provided as an input to the Bluetooth frequency synthesizer 203 via signal 225. The frequency controller 207 may utilize the $BT_{chan\_num}$ signal 225 to control the Bluetooth frequency synthesizer 203 during adaptive frequency hopping (AFH).

In another embodiment of the invention, the RF Bluetooth transmit signal 232 may be generated directly by modulating the Bluetooth carrier frequency 219 as indicated in the following expression:

$$2.4 \text{ GHz} + BT_{chan\_num} \times 1 \text{ MHz} + \Delta f_{BT\_data},$$

where $\Delta f_{BT\_data}$ is the frequency deviation that corresponds to the data in the transmitted Bluetooth signal. In instances when the Bluetooth RF transmit signal 232 is generated by the Bluetooth frequency synthesizer 203, the Bluetooth processor 215 may communicate the $BT_{chan\_num}$ and $\Delta f_{BT\_data}$ via signal 225 to the frequency controller 207.

The Bluetooth frequency synthesizer 203 may comprise suitable logic and/or circuitry that may enable generation of the Bluetooth carrier frequency 219 by multiplying the FM carrier frequency 221 by a scalar 303. The scalar 303 may be generated by the frequency controller 207 as the ratio of the Bluetooth carrier frequency 219 (2.4 GHz+$BT_{chan\_num} \times 1$ MHz+$\Delta f_{BT\_data}$) to the FM carrier frequency 221 (47.9+$FM_{Rx\_chan} \times 0.2$ MHz+$\Delta f_{FM\_data}$).

Figure 4:
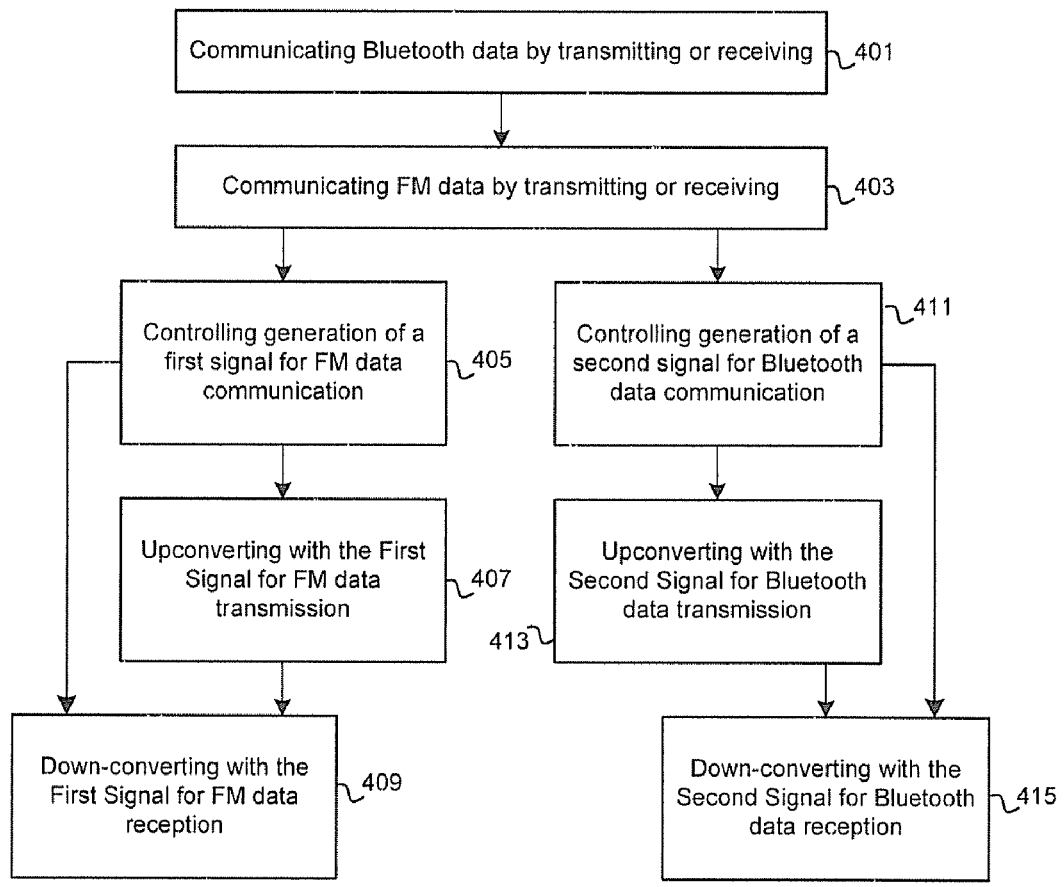
FIG. 4 is a flow diagram that illustrates exemplary steps for frequency conversion in accordance with an embodiment of the invention.

FIG. 4 is a flow diagram that illustrates exemplary steps for frequency conversion in accordance with an embodiment of the invention. Referring to FIG. 4, in step 403, FM data may be communicated via transmission and/or reception. Step 405 may comprise controlling generation of a first signal for FM data communication. In this regard, the FM data may be modulated on an FM carrier frequency, which may be generated for FM data communication. In step 407, for up-conversion, the FM carrier frequency may be utilized to modulate the FM data for transmission. In step 409, for down-conversion, the FM carrier frequency may be removed from the FM data during demodulation of a receive signal.

In step 401, communication of Bluetooth data may comprise transmission and/or reception of Bluetooth data. Step 411 may comprise controlling generation of a second signal, such as a Bluetooth carrier frequency, for Bluetooth data communication. In this regard, the Bluetooth data may be modulated on a Bluetooth carrier frequency, which may be generated for Bluetooth data communication. In step 413, for up-conversion, the second signal such as the Bluetooth carrier frequency signal, may be utilized to modulate the Bluetooth data during transmission. In step 415, for down-conversion, the second signal such as he Bluetooth carrier frequency, may be removed from the Bluetooth data during demodulation.

Figure 5:
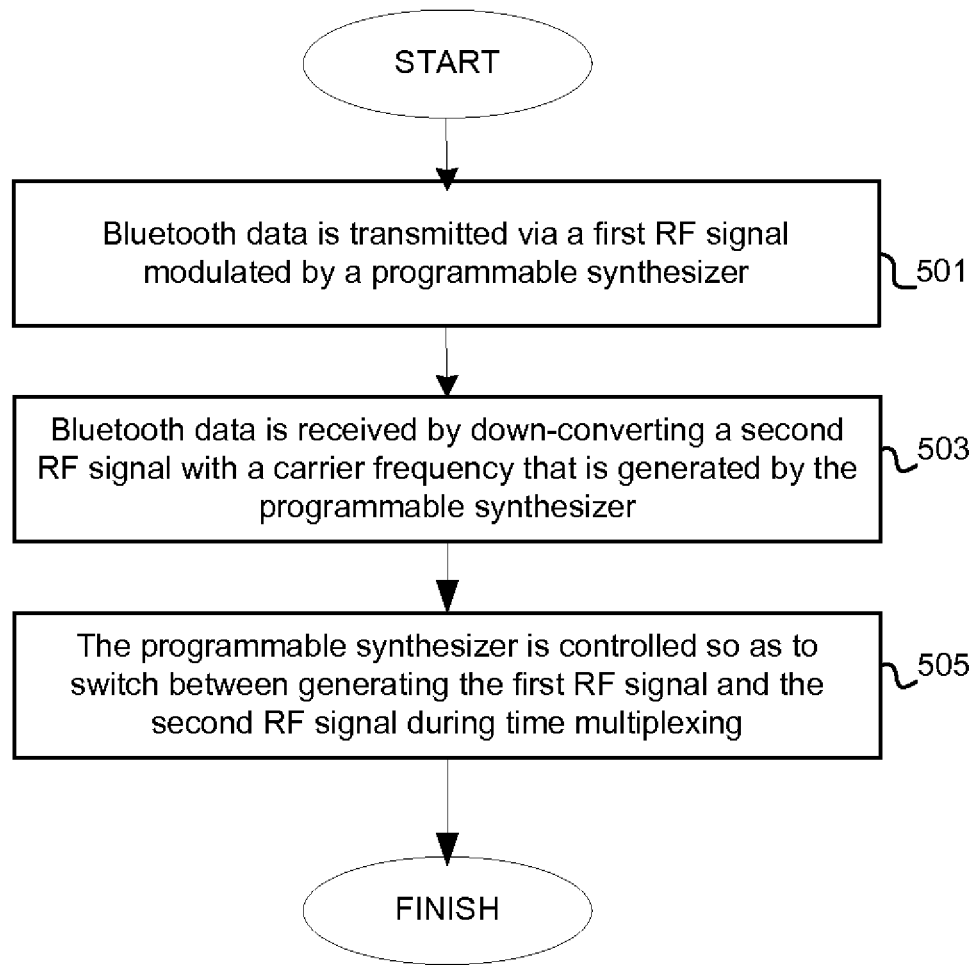
FIG. 5 is a flow diagram that illustrates an exemplary method for frequency conversion in accordance with an embodiment of the invention.

FIG. 5 is a flow diagram that illustrates an exemplary method for frequency conversion, in accordance with an embodiment of the invention. In step 501, Bluetooth data may be transmitted via a first RF signal 232 that is modulated by a programmable synthesizer 203. In step 503, Bluetooth data may be received by down-converting a second RF signal 233 with a carrier frequency 219 that is generated by the programmable synthesizer 203. In step 505, the programmable synthesizer 203 may be controlled, using for example, signal 239, to switch between generating the first RF signal 232 and the second RF signal 233 while time multiplexing between transmission of the Bluetooth data and reception of the Bluetooth data.

The programmable Bluetooth synthesizer 203 may enable generation of the first RF signal 232 and the second RF signal 233 based on an oscillator signal 217. The FM carrier frequency 221 may be generated based on the first signal or the second signal resulting from the programmable synthesizer 203. Alternatively, the programmable synthesizer 203 may enable generation of the FM carrier frequency based on an oscillator signal, and the first or second signal may be generated based on the FM carrier frequency.

In accordance with an embodiment of the invention, with reference to FIG. 3, a system for supporting wireless communication may comprise a programmable synthesizer 203 that modulates a first RF signal 232 for transmission of Bluetooth data. The programmable synthesizer 203 may enable generation of a carrier frequency 219 that down-converts a second RF signal 233 for reception of Bluetooth data via signal 233. The programmable synthesizer 203 may have the capability to switch between generation of the first RF signal 233 during time multiplexing between transmission of Bluetooth data and reception of the Bluetooth data.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for supporting wireless communication, the method comprising:
    transmitting Bluetooth data via a first RF signal that is modulated by a programmable synthesizer;
    receiving Bluetooth data by down-converting a received second RF signal with a Bluetooth carrier frequency that is generated by said programmable synthesizer;

controlling said programmable synthesizer to switch between generating said first RF signal and said Bluetooth carrier frequency during time multiplexing between said transmitting and said receiving; and generating an FM carrier frequency based on said Bluetooth carrier frequency generated by said programmable synthesizer.

2. The method according to claim 1, comprising receiving an oscillator signal by said programmable synthesizer that is used to generate said first RF signal and said Bluetooth carrier frequency.

3. The method according to claim 1, wherein said FM carrier frequency is generated based on a frequency control signal.

4. The method according to claim 1, wherein said Bluetooth carrier frequency is generated based on a frequency control signal.

5. The method according to claim 1, wherein said FM carrier frequency is generated based on an oscillator signal.

6. The method according to claim 5, wherein said programmable synthesizer receives said FM carrier frequency to generate a RF FM transmit signal and down-convert a received FM signal.

7. A system for supporting wireless communication, the system comprising:
- a programmable synthesizer that is operable to modulate a first RF signal for transmission of Bluetooth data;
- said programmable synthesizer is operable to generate a Bluetooth carrier frequency that down-converts a received second RF signal for reception of Bluetooth data; and
- said programmable synthesizer is operable to switch between generation of said first RF signal and said Bluetooth carrier frequency during time multiplexing between said transmission and said reception, wherein said Bluetooth carrier frequency generated by said programmable synthesizer is used to generate an FM carrier frequency.

8. The system according to claim 7, wherein said programmable synthesizer is operable to receive an oscillator signal that is used to generate said first RF signal and said Bluetooth carrier frequency.

9. The system according to claim 7, wherein said FM carrier frequency is generated based on a frequency control signal.

10. The system according to claim 7, wherein said Bluetooth carrier frequency is generated based on a frequency control signal.

11. The system according to claim 7, wherein said FM carrier frequency is generated based on an oscillator signal.

12. The system according to claim 11, wherein said programmable synthesizer is operable to generate a RF FM transmit signal and down-convert a received FM signal based on said FM carrier frequency.

13. A system for supporting wireless communication, the system comprising:
- a programmable synthesizer;
- a Bluetooth transmitter that enables transmission of data via a first RF signal that is modulated by the programmable synthesizer;
- a Bluetooth receiver that enables receiving of Bluetooth data by down-converting a received second RF signal with a Bluetooth carrier frequency that is generated by said programmable synthesizer;
- a controller that enables controlling of said programmable synthesizer to switch between generating said first RF signal and said Bluetooth carrier frequency during time multiplexing between said Bluetooth transmitter and said Bluetooth receiver; and
- an FM carrier frequency generator, said FM carrier frequency generator generates an FM carrier frequency based on said Bluetooth carrier frequency.

14. The system according to claim 13, wherein said programmable synthesizer enables receiving of an oscillator signal to generate said first RF signal and said Bluetooth carrier frequency.

15. The system according to claim 13, wherein said FM carrier frequency generator uses a frequency control signal to generate the FM carrier frequency.

16. The system according to claim 13, wherein said FM carrier frequency generator uses an oscillator signal to generate said FM carrier frequency.

17. The system according to claim 16, wherein said programmable synthesizer receives said FM carrier frequency to generate a RF FM transmit signal and down-convert a received FM signal.

* * * * *